UNITED STATES PATENT OFFICE.

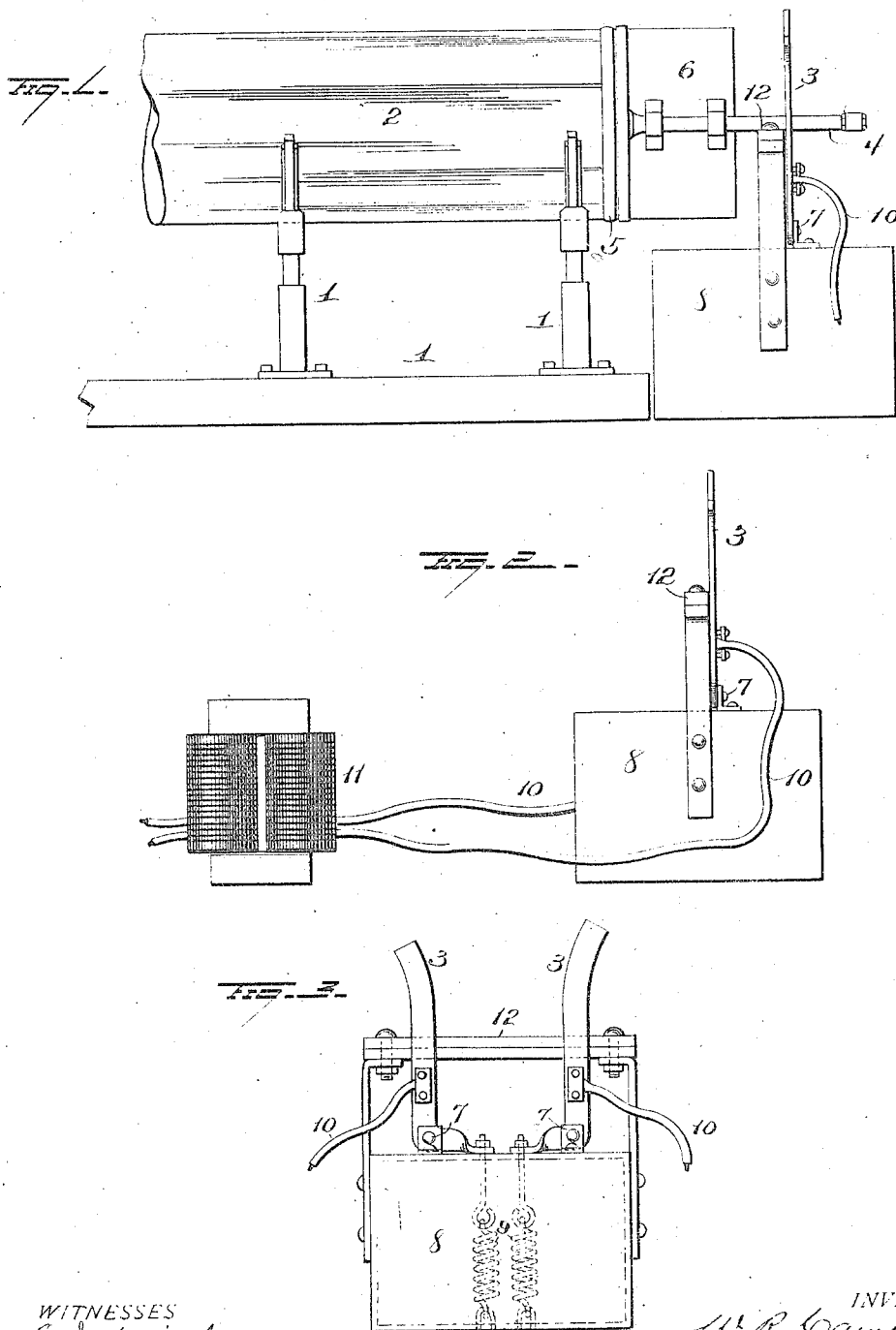

WILLIAM R. CAMPBELL, OF LANCASTER, OHIO.

METHOD OF DRAWING GLASS.

1,180,565. Specification of Letters Patent. Patented Apr. 25, 1916.

Application filed June 18, 1914. Serial No. 845,905.

*To all whom it may concern:*

Be it known that I, WILLIAM R. CAMPBELL, of Lancaster, in the county of Fairfield and State of Ohio, have invented certain new and useful Improvements in Methods of Drawing Glass; and I do hereby declare the following to be a full, clear, and exact description of the invention, such as will enable others skilled in the art in which it appertains to make and use the same.

My invention relates to an improvement in method of drawing glass.

In the manufacture of glass cylinders or rollers, after the cylinder has been drawn, the bait carrying the cylinder is disconnected from the drawing apparatus, and the cylinder with the bait attached, is turned to a horizontal position and deposited on a horse which supports it while being cut up into section. It is customary to first disconnect the bait from the cylinder, by severing the cylinder close up to the bait, but frequently, before this can be done, the unequal cooling and consequent contraction of the glass cylinder and metal bait, causes the glass to fracture, which results at times, in the loss of the whole cylinder.

The object of this invention is to provide means for maintaining the contacting parts of the bait and cylinder in a heated condition after the bait has been removed from the drawing apparatus, and up to the time it is severed from the cylinder, and it consists in the several steps of the method, as will be more fully explained and pointed out in the claims.

In the accompanying drawings, Figure 1 is a view in side elevation of one form of apparatus for carrying out my invention; Fig. 2 is a view in side elevation of same and Fig. 3 is a view in end elevation.

This improvement is particularly applicable to the system of drawing glass, wherein the portion of the bait which is engaged by the glass is of high resistance material, or otherwise constructed to be heated by an electric current, for maintaining the proper temperature of the bait and also the glass in contact with the bait, during the entire drawing operation, but it may be employed in connection with systems wherein the bait is maintained in a heated condition by means of other than an electric current, during the drawing operation, and up to the time the bait with the cylinder attached is disconnected and removed from the drawing apparatus.

The apparatus shown for carrying out the improved method, comprises a horse 1 of ordinary construction, on which the glass cylinder 2 is deposited in a horizontal position after it has been disconnected and removed from the drawing apparatus, and a pair of yielding contacts 3 located in a position to engage the bait or conductor leads 4 which have electrical connection with the metal ribbon bait 5, secured to and carried by the hood 6 of the bait. The ribbon bait 5 is the part to which the glass adheres during the drawing operation, and is the part which is maintained in a heated condition by a current of electricity passed through the leads 4 during the drawing operation. The contacts 3 are bell crank in shape and are pivoted at 7 to the frame 8 located adjacent one end of the horse 1. The longer upright arms of the contacts 3 are curved at their upper ends as shown in Fig. 3, so as to permit of the ready and easy entrance of the leads 4 between them, and they are connected at the free ends of their shorter horizontal arms to springs 9 which yieldingly hold the contacts in a position to be engaged by the leads 4, and which are free to give or separate under the weight of the leads. Each contact 3 is connected with a conductor 10 both of which are connected with a current transformer or other source of supply. The frame 8 is also provided with the saddle 12 located in a position to receive and support the weight of the leads 4 and part of the weight of the bait 5—6, when the cylinder is resting on the horse 1.

As soon as the leads 4 engage the contacts 3, the circuit through the ribbon 5 will be closed thus heating the same and maintaining it in a heated condition so long as the leads remain in contact with the contacts 3. By maintaining the bait and the glass adhering thereto, at approximately the same temperature, any undue contraction of either part is prevented and great saving is effected by avoiding breakage.

Instead of providing the horse with contacts as above explained, the leads 4 could be coupled up to flexible wires which could be arranged to permit the bait and cylinder to be moved from the drawing apparatus to the horse without disconnecting the wires and without discontinuing the heat.

Having fully described my invention what I claim as new and desire to secure by Letters-Patent, is:—

1. The herein described method consisting in continuing the heat through the bait and attached end of a glass cylinder, after the bait and cylinder have been removed from the glass drawing apparatus, whereby undue cooling of either the bait or end of glass cylinder attached to the bait is prevented until the cylinder has been severed from the bait.

2. The herein described method consisting in depositing a glass cylinder and its attached glass bait on a suitable support, and then passing a heating current of electricity through the bait whereby the latter and the connected end of the cylinder will be reheated.

In testimony whereof, I have signed this specification in the presence of two subscribing witnesses.

WILLIAM R. CAMPBELL.

Witnesses:
RALPH H. WOLFE,
T. T. COURTRIGHT.